(12) United States Patent
Pilon

(10) Patent No.: US 10,795,107 B2
(45) Date of Patent: Oct. 6, 2020

(54) MODULAR FIBER OPTIC CASSETTE, SYSTEM AND METHOD

(71) Applicant: BELDEN CANADA INC., Saint-Laurent (CA)

(72) Inventor: Vincent Pilon, Lachine (CA)

(73) Assignee: BELDEN CANADA ULC

(*) Notice: Subject to any disclaimer, the term of this patent is extended or adjusted under 35 U.S.C. 154(b) by 0 days.

(21) Appl. No.: 16/143,831

(22) Filed: Sep. 27, 2018

(65) Prior Publication Data

US 2019/0101717 A1    Apr. 4, 2019

Related U.S. Application Data (60) Provisional application No. 62/567,339, filed on Oct. 3, 2017.

(51) Int. Cl.
*G02B 6/44* (2006.01)
*G02B 6/46* (2006.01)

(52) U.S. Cl.
CPC .............. *G02B 6/4455* (2013.01); *G02B 6/46* (2013.01)

(58) Field of Classification Search
CPC .................................................. G02B 6/4455
See application file for complete search history.

(56) References Cited

U.S. PATENT DOCUMENTS

| | | | | |
|---|---|---|---|---|
| 4,792,203 A * | 12/1988 | Nelson | ...................... | G02B 6/24 385/134 |
| 7,331,722 B2 * | 2/2008 | Tan | ...................... | G02B 6/12026 385/135 |
| 7,509,015 B2 * | 3/2009 | Murano | ............... | G02B 6/4453 135/134 |
| 8,913,866 B2 * | 12/2014 | Cote | ..................... | G02B 6/4453 385/135 |
| 9,008,485 B2 * | 4/2015 | Ramirez | ............... | G02B 6/4452 361/825 |
| 9,075,216 B2 * | 7/2015 | Cote | ..................... | G02B 6/4452 |
| 10,215,944 B2 * | 2/2019 | Sedor | ................... | G02B 6/3897 |
| 10,281,672 B1 * | 5/2019 | Mullsteff | ............ | G02B 6/4452 |
| 10,514,518 B1 * | 12/2019 | Livingston | ........... | G02B 6/4454 |
| 2002/0131730 A1 * | 9/2002 | Keeble | ................. | G02B 6/4201 385/92 |
| 2007/0131628 A1 * | 6/2007 | Mimlitch, III | ....... | A47B 47/024 211/26 |

(Continued)

Primary Examiner — Rhonda S Peace
(74) Attorney, Agent, or Firm — Lavery, De Billy, LLP; Hugh Mansfield (57) ABSTRACT

A modular fiber optic cassette system, method and cassette is disclosed. The system comprises a case defining a tray receiving space and an opening to a tray receiving space, at least one tray slideably received within the case for movement between a stored position wherein the tray is inside the case and an accessible position wherein a front end of the tray is in front of the opening and outside of the case, a plurality of fiber optic cassettes arrangeable side by side along the tray front end, a first of the cassettes comprising a first cassette width of one of one, two, three, four or six standard width units and a second of the cassettes comprising a second cassette width different from the first cassette width and one of one, two, three, four or six standard width units, and a fastener assembly for removeably securing each of the cassettes to the tray.

15 Claims, 13 Drawing Sheets

(56) References Cited

U.S. PATENT DOCUMENTS

| | | | |
|---|---|---|---|
| 2009/0290842 A1* | 11/2009 | Bran de Leon | G02B 6/4454 |
| | | | 385/135 |
| 2016/0033732 A1* | 2/2016 | Giraud | G02B 6/4452 |
| | | | 385/135 |
| 2016/0062050 A1* | 3/2016 | Giraud | G02B 6/3825 |
| | | | 385/56 |
| 2019/0004268 A1* | 1/2019 | Vogel | G02B 6/4452 |
| 2019/0101717 A1* | 4/2019 | Pilon | G02B 6/4455 |
| 2019/0107682 A1* | 4/2019 | Aramayo | G02B 6/4455 |
| 2019/0162924 A1* | 5/2019 | Fontaine | G02B 6/3897 |
| 2019/0187394 A1* | 6/2019 | Fontaine | G02B 6/4455 |

* cited by examiner

MODULAR FIBER OPTIC CASSETTE, SYSTEM AND METHOD

CROSS REFERENCE TO RELATED APPLICATIONS

This Application claims priority under 35 USC § 119(e) of U.S. provisional application Ser. No. 62/567,339 filed on Oct. 3, 2017 which is incorporated herein in its entirely by reference.

FIELD OF THE INVENTION

The present invention relates to a modular fiber optic cassette, system and method. In particular, the present invention relates to a fiber optic cassette comprising a width of one or more standard width units and such that fiber optic cassettes of different widths can be arranged on the same tray while optimizing the use of tray space.

BACKGROUND OF THE INVENTION

The prior art discloses fiber optic cassettes or splice boxes for use in terminating fiber optic trunk cables and splitting them out to patch cables which are removeably arranged on tray systems within a rack mounted case. One drawback of these cassettes and tray systems is that they are typically preconfigured to terminate fiber optic cables comprising a single predetermined number of optic fibers. Another drawback is that cassettes which are used to terminate fiber optic cables comprising different numbers of optic fibers are generally incompatible with one another and additionally require trays with different spacing, securing mechanisms and the like.

SUMMARY OF THE INVENTION

In order to address the above and other drawbacks there is provided a modular fiber optic cassette system. The system comprises a case comprising a top and a bottom wall and two opposed side walls, each of the sidewalls attached between respective side edges of the top and bottom wall, the walls together defining a tray receiving space there between and a forward edge of each the wall together defining an opening to the tray receiving space, at least one tray slideably received within the tray receiving space for movement between a stored position wherein the tray is completely inside the tray receiving space and an accessible position wherein a front end of the tray is in front of the opening and outside of the tray receiving space, a set of fiber optic cassettes, a selected plurality of the cassettes arrangeable side by side along the tray front end wherein each of the cassettes comprises a plurality of optic plug receiving receptacles arranged side by side in a row along a front thereof, a first of the set of cassettes comprising a first cassette width of one of one, two, three, four and six standard width units and a second of the cassettes comprising a second cassette width different from the first cassette width and one of one, two, three, four and six standard width units, and a fastener for removeably securing each of the cassettes to the tray.

Additionally, there is provided a method for organising a tray comprising a front edge in a fiber optic interconnect system. The method comprises defining a standard width unit wherein a width of the front edge is substantially evenly divisible by the standard width unit, selecting a plurality of cassettes for installation on the tray from a set of cassettes having a plurality of different widths, wherein each of the different widths is evenly divisible by the standard width unit, and releasably securing the selected cassettes along the front edge of the tray.

There is also provided a modular fiber optic cassette for releasably securing to a tray fabricated from a ferrous metal. The cassette comprises an elongate rectangular optic fiber receiving housing, a plurality of optic plug receiving receptacles arranged in a row along a front of the housing, a multi fiber connector receiving receptacle on a rear thereof, a plurality of optic fibers interconnecting a respective one of the optic plug receiving receptacles with the multi fiber connector receiving receptacle, and a magnet secured to an underside of the housing.

BRIEF DESCRIPTION OF THE DRAWINGS

FIGS. 4A through 4D provide raised right front perspective views of a tray populated with respectively six (6), four (4), three (3) and two (2) cassettes of different widths;

DETAILED DESCRIPTION OF THE ILLUSTRATIVE EMBODIMENTS

Figure 1:
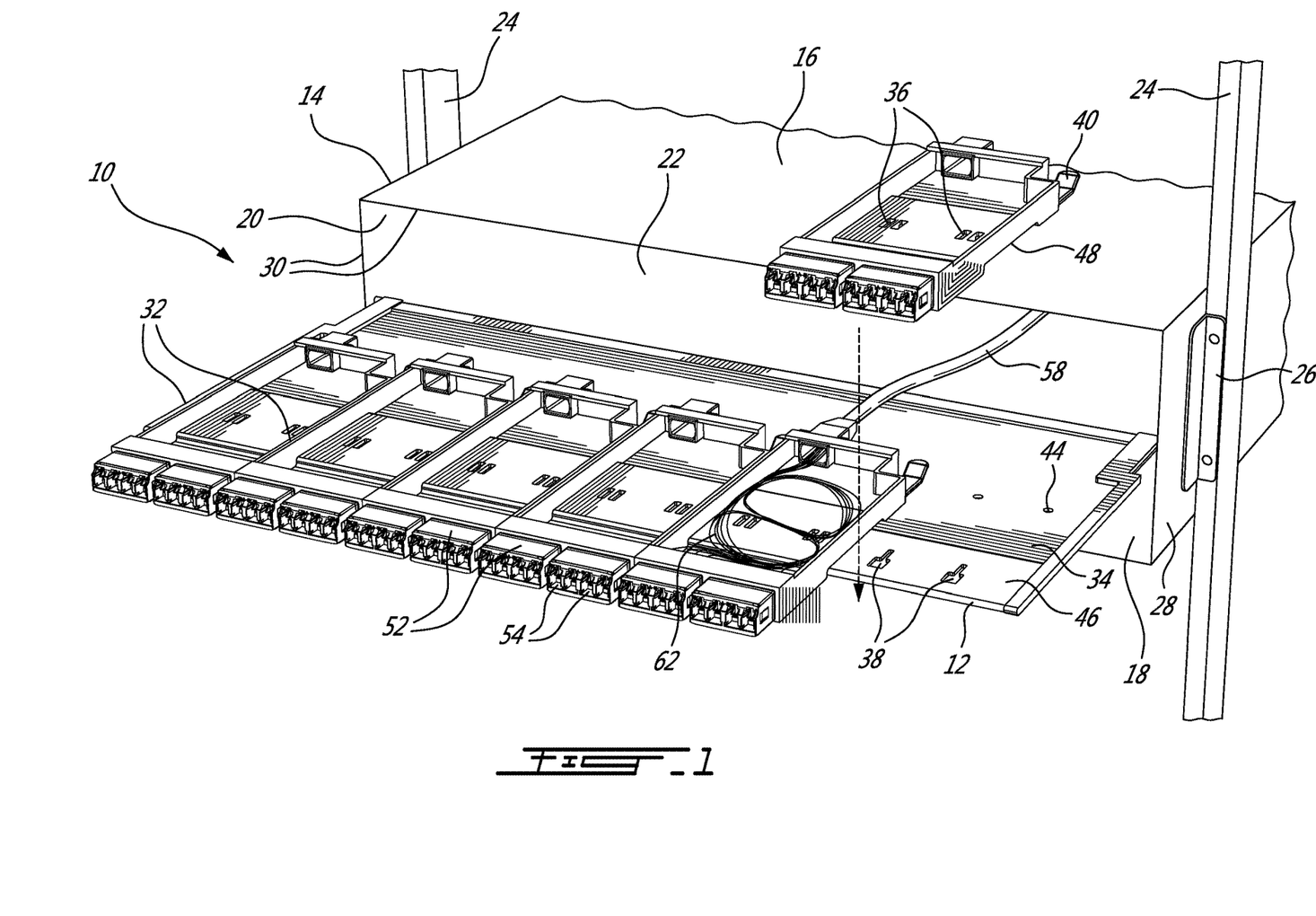
FIG. 1 provides a right front perspective view of a modular fiber optic cassette and system mounted in a rack and in accordance with an illustrative embodiment of the present invention.

Referring now to FIG. 1, a modular cassette system, generally referred to using the reference numeral 10, will now be described. The modular cassette comprises a slideable tray 12 illustratively mounted within a case 14. The case 14 comprises a top wall 16, a bottom wall 18 and a pair of opposed side walls 20 defining a tray receiving space 22 therebetween. The case 14 is illustratively mounted to the rails 24 of a rack via a pair of mounting brackets 26 wherein one of the brackets 26 is attached to an outer surface 28 of a respective one of the sidewalls 20. The front edges 30 of the walls 16, 18, 20 define an opening via which the tray receiving space 22 can be accessed. In a particular illustrated embodiment the system 10 is shown for mounting in a 19" rack, however in a particular embodiment the system 10, with suitable modifications, may be mounted equally in a cross connect system, fiber bay or wall mount or the like.

Figures 2A, 2B:
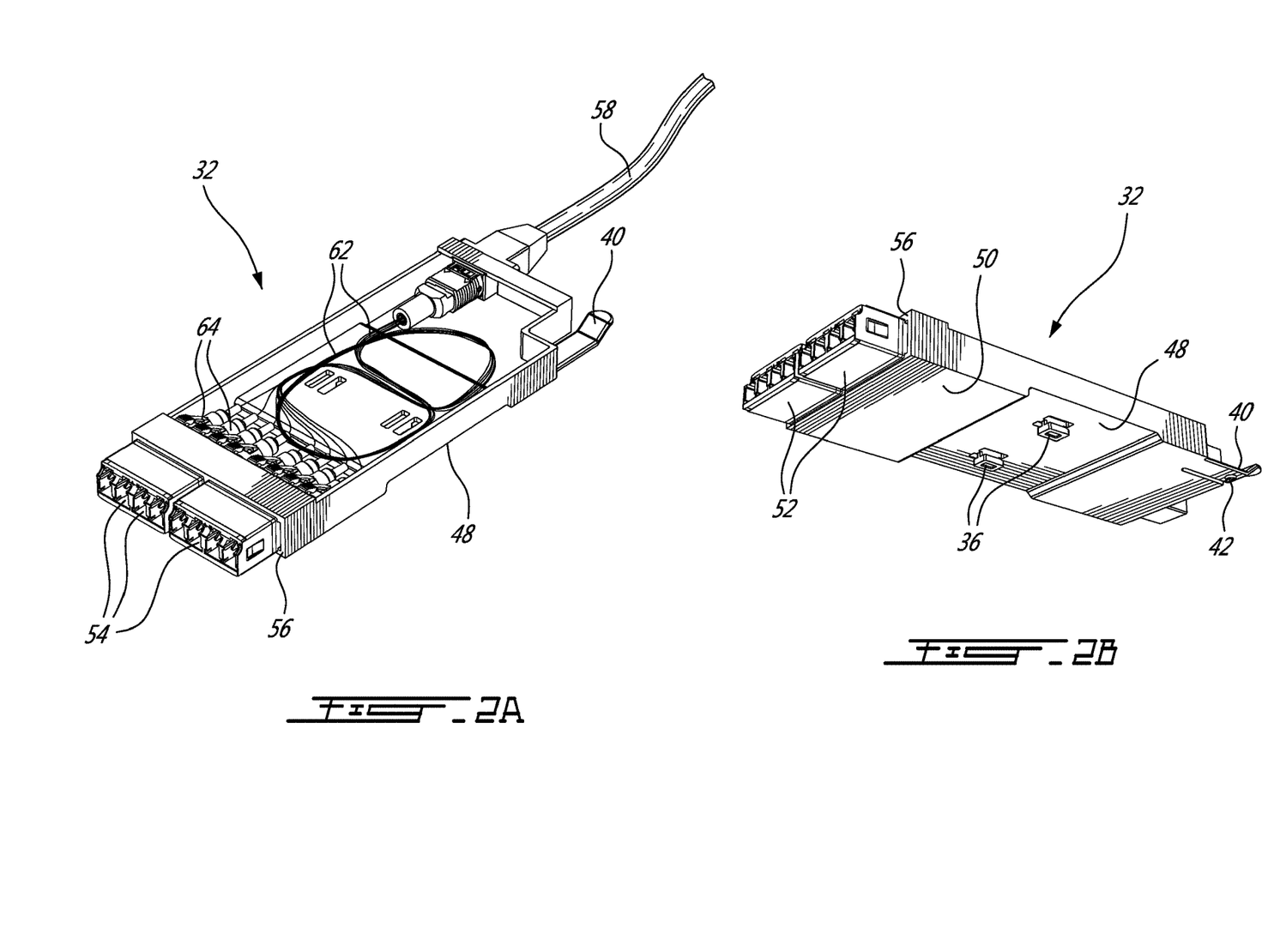
FIGS. 2A and 2B provide respectively a raised right front perspective view and a lowered right front perspective view of a modular fiber optic cassette in accordance with an illustrative embodiment of the present invention.
Figure 3:
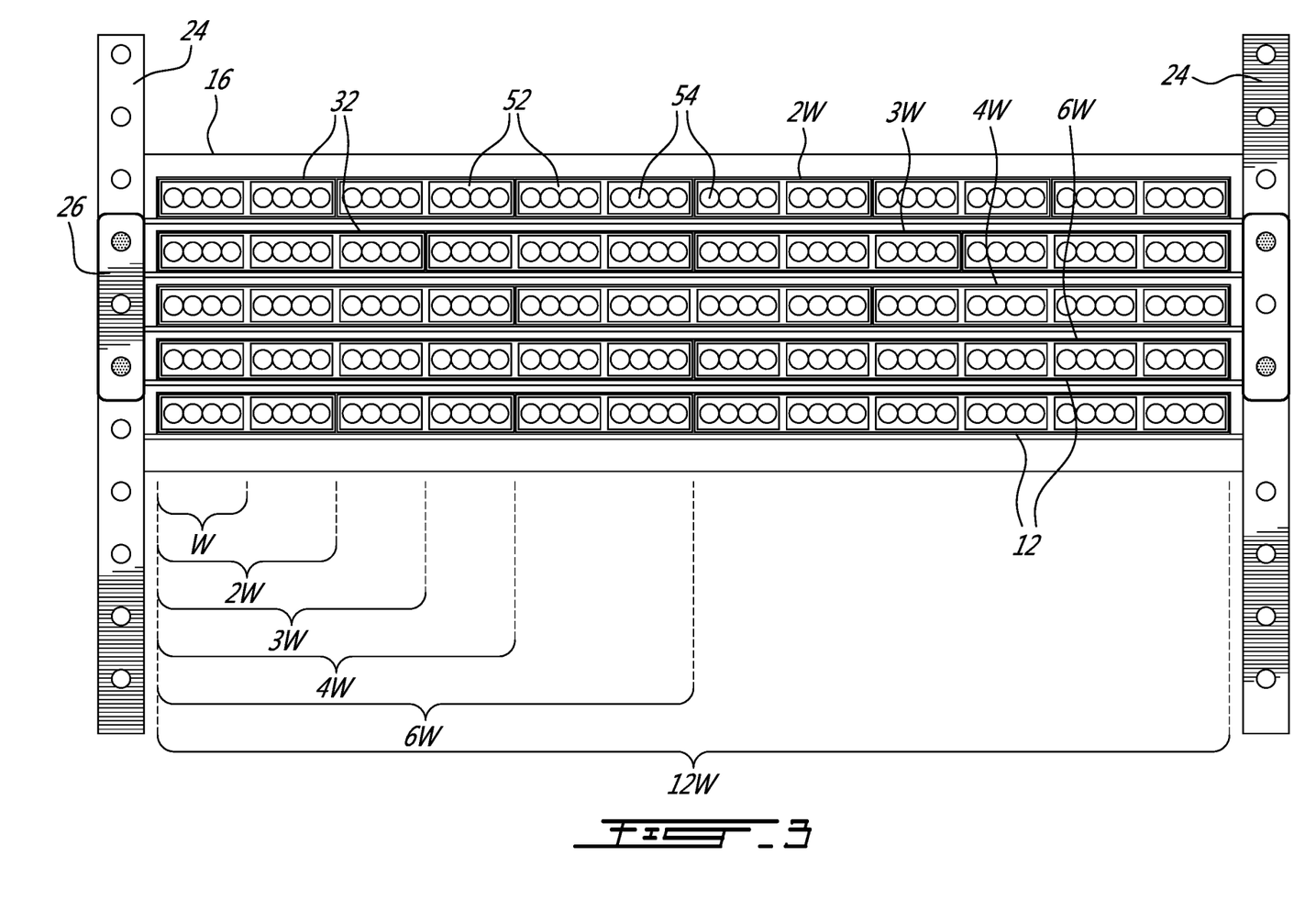
FIG. 3 provides a front plan view of a modular fiber optic cassette system mounted in a rack in accordance with an illustrative embodiment of the present invention.
Figure 4A:
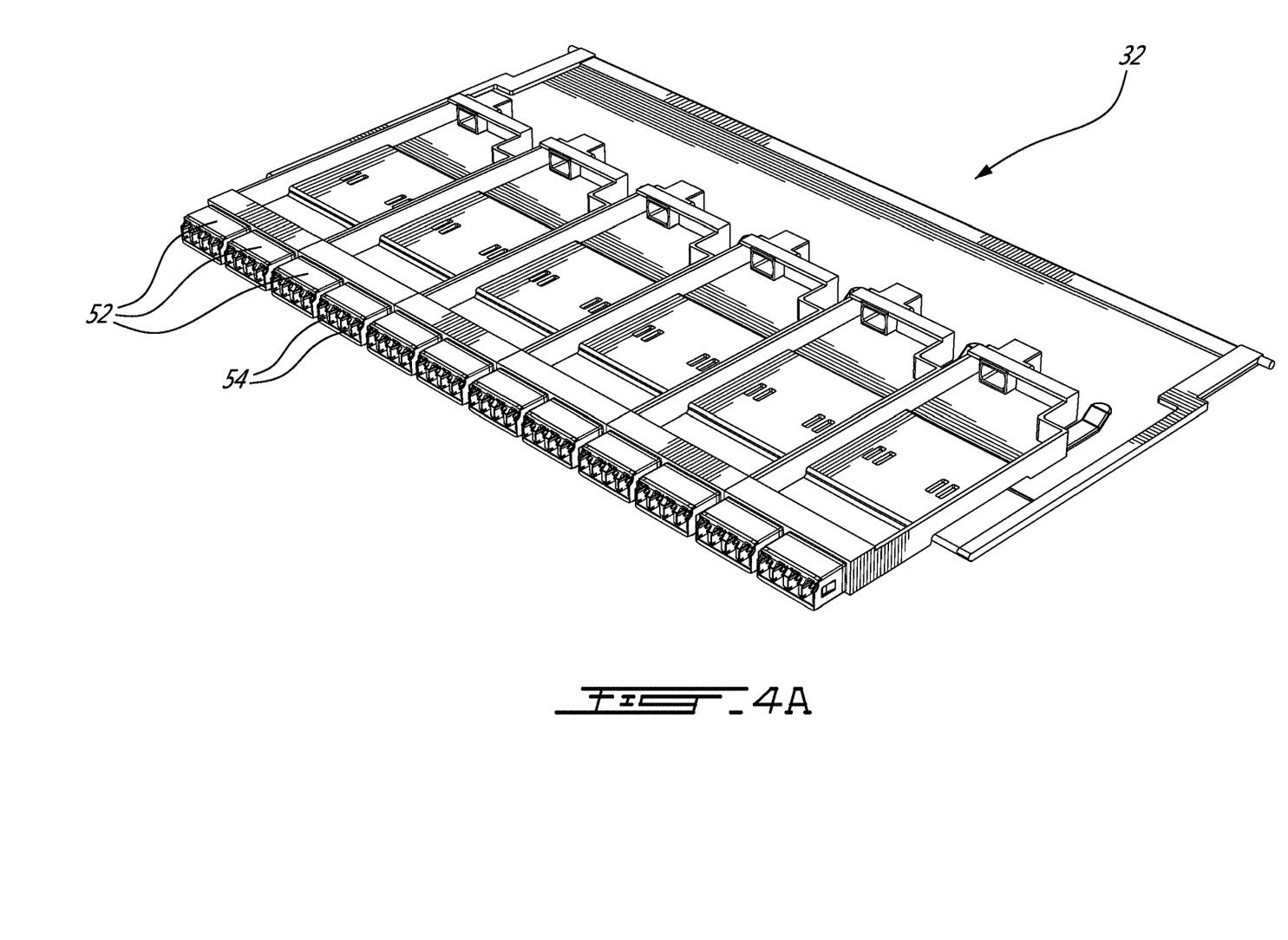
Figure 4B:
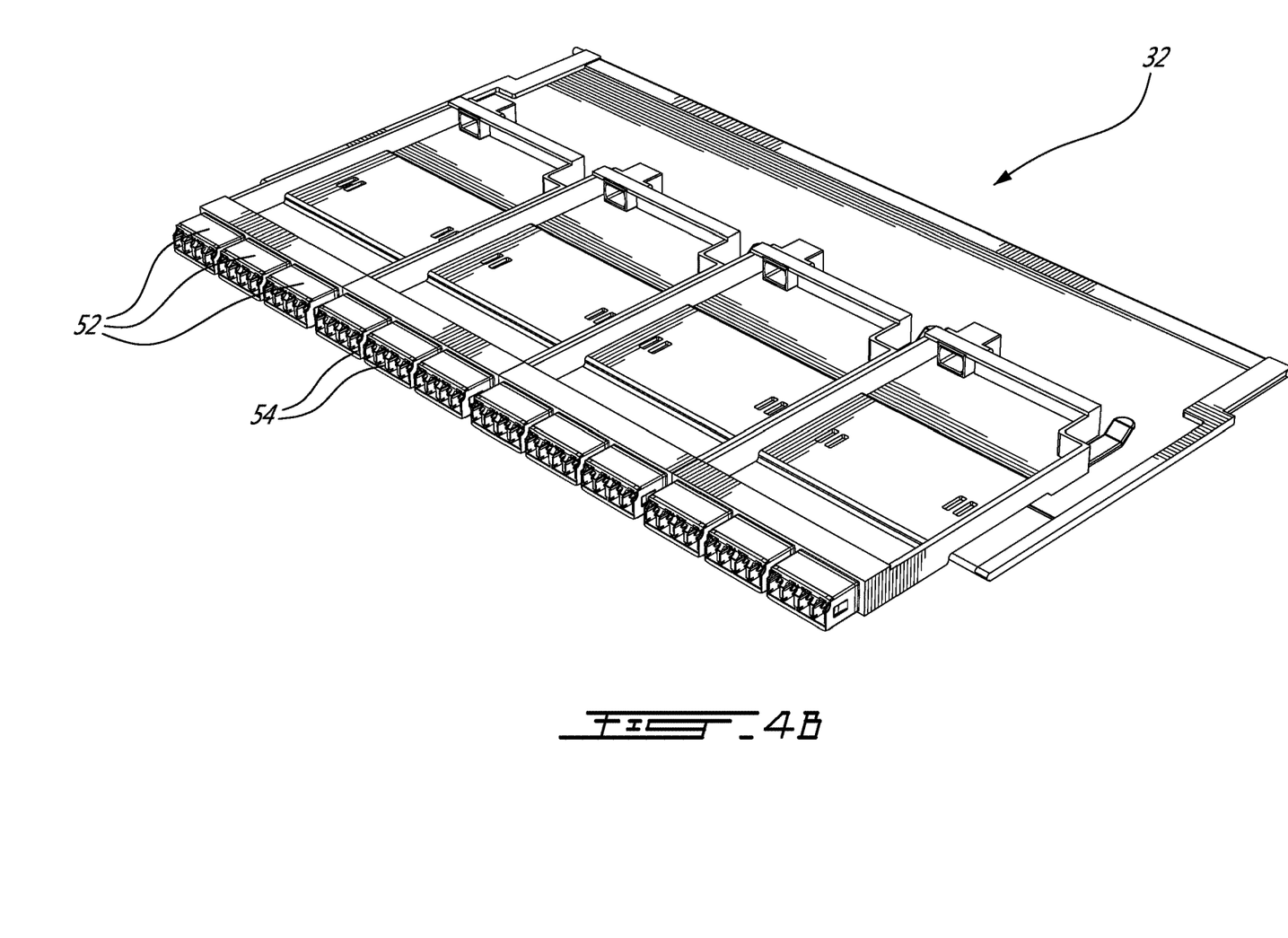
Figure 4C:
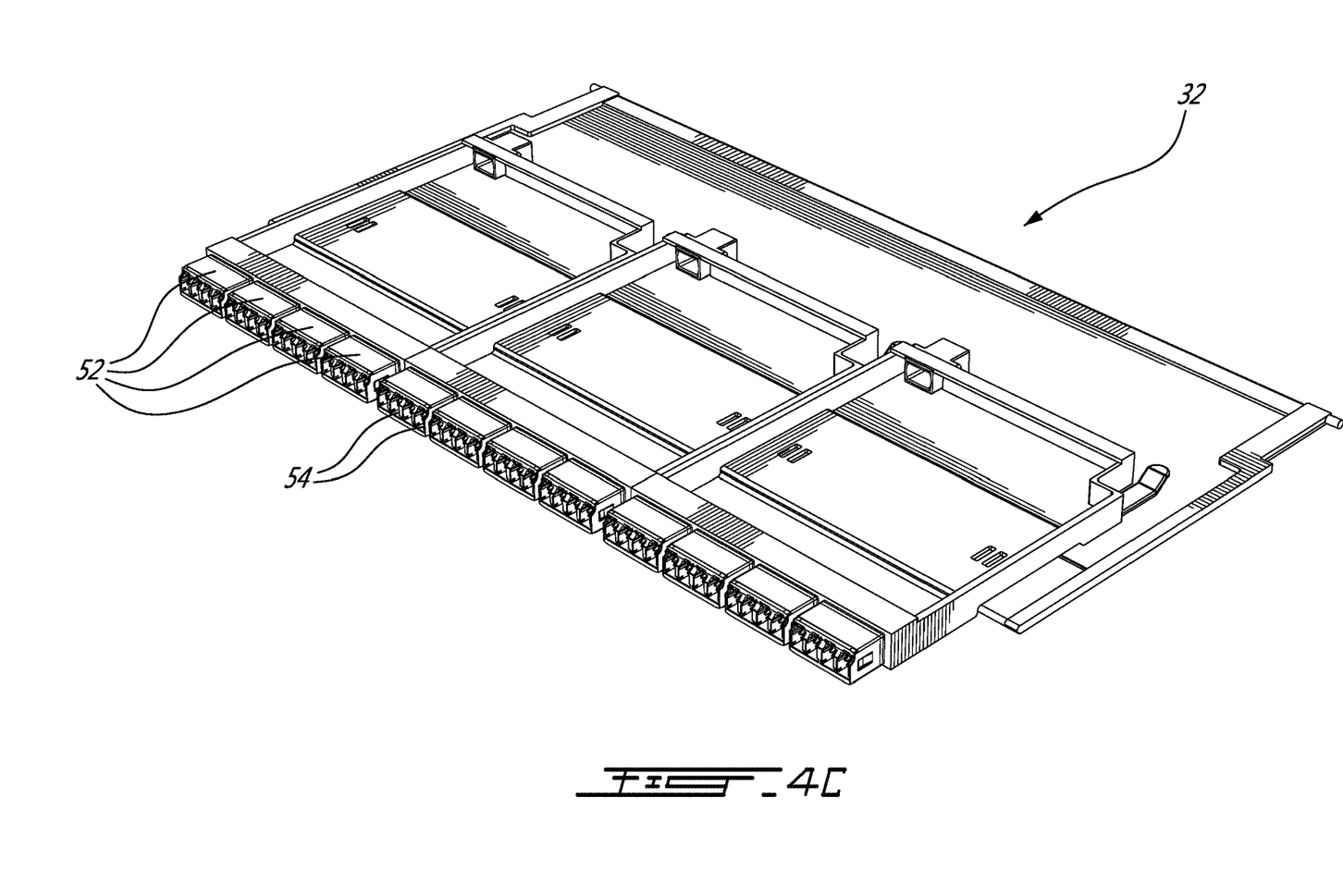

Referring to FIGS. 2A and 2B in addition to FIG. 1, the tray 12 receives a plurality of removable fiber optic module or cassettes 32 arranged side by side on an upper surface 34 thereof. In a first embodiment each fiber optic cassette 32 is secured to the tray 12 using a fastener comprising tabs 36 of inverted "T" cross section which engage with respective slots 38 machined or otherwise formed in the tray 12. A flexible tab 40 is also provided which comprises a boss 42 that engages a respective aperture 44 machined or otherwise formed in the tray 12 when the tabs 36 are engaged within their respective slots 38, thereby releasably securing the cassette 32 to the tray 12. In order to better orient the cassette 36 on the tray during installation, the tray 12 comprises a raised shoulder 46 which is received within a channel 48 moulded or otherwise formed in an underside 50 of the cassette 32.

Still referring to FIGS. 2A and 2B, each cassette 32 illustratively comprises a plurality of receptacle modules 52 each comprising a plurality of receptacles 54, illustratively LC Quad type receptacles, arranged in a row and exposed along a forward edge 56 of the cassette 32. The cassette 32 also illustratively terminates a fiber optic cable 58, such as a trunk cable or the like, comprising a plurality of optic fibers at a multi-fiber connector receiving receptacle 60 on a rearward edge. Each optic fiber of the fiber optic cable 58 is interconnected with a respective one of the receptacles 54 using an optic fiber segment 62 comprising a receptacle end which is terminated by a plug 64. The segments 62, which are typically longer than the distance between the forward edge and the rearward edge, are typically looped several times within the cassette 32, for example in a serpentine or the like. A person of ordinary skill in the art will understand that an optic fiber terminated with a plug (not shown) inserted into a selected one of the receptacles 54 will interconnect the optic fiber with a selected optic fiber segment 62.

Referring now to FIG. 3 and FIGS. 4A through 4D, as discussed above, each cassette 32 illustratively comprises a plurality of receptacle modules 52 each comprising four (4) receptacles 54. It is foreseen to provide a set of four (4) different cassette sizes to accommodate terminating fiber optic cables comprising different number of optic fibers. Each of the different cassette sizes of the set is based on an integer multiple of a standardised pitch or width unit W wherein one standardized width unit accommodates a single receptacle module 52 comprising four (4) receptacles 54. Illustratively, a 2 W cassette 32 comprising two (2) modules 52 accommodating eight (8) optic fibers (FIG. 4A) is provided, a 3 W cassette 32 comprising three (3) modules 52 accommodating twelve (12) optic fibers (FIG. 4B) is provided, a 4 W cassette 32 comprising four (4) modules 52 accommodating sixteen (16) optic fibers (FIG. 4C) is provided and a 6 W cassette 32 comprising six (6) modules 52 accommodating twenty-four (24) optic fibers (FIG. 4D) is provided for. The 2 W, 3 W, 4 W and 6 W cassettes 32 are typically used only with like cassettes 32 as illustrated and such that respectively six (6), four (4), three (3) and two (2) cassettes fit snuggly side by side on the 12 W tray, although in a particular embodiment cassettes 32 of different widths could be used together.

Although the present illustrative embodiment In a particular embodiment the pitch/width W is based on a LC Quad (SC Duplex) technology footprint comprising four (4) connectors, in an alternative embodiment the pitch/width W could be based on a different technology footprint, including SC Duplex comprising two (2) connectors and MPO type connectors comprising inter alia multiple optic fibers such as MPO-12, MPO-16 and MPO-24.

Still referring to FIGS. 3, 4A through 4D in addition to FIG. 1, a person of ordinary skill in the art will now understand that the disclosed system of cassettes 32 can be used to accommodate optic fiber cables 58 comprising different numbers of optic fibers 62 while ensuring that the same number of optic fibers 62 are accessible via the exposed receptacles 54.

Referring back to FIG. 1, the spacing between adjacent slots 38 as well as the spacing between adjacent apertures 44 conforms to the standardised width unit W and such that the 2 W, 3 W, 4 W and 6 W cassettes 32 can be readily accommodated on the tray.

Figure 5A:
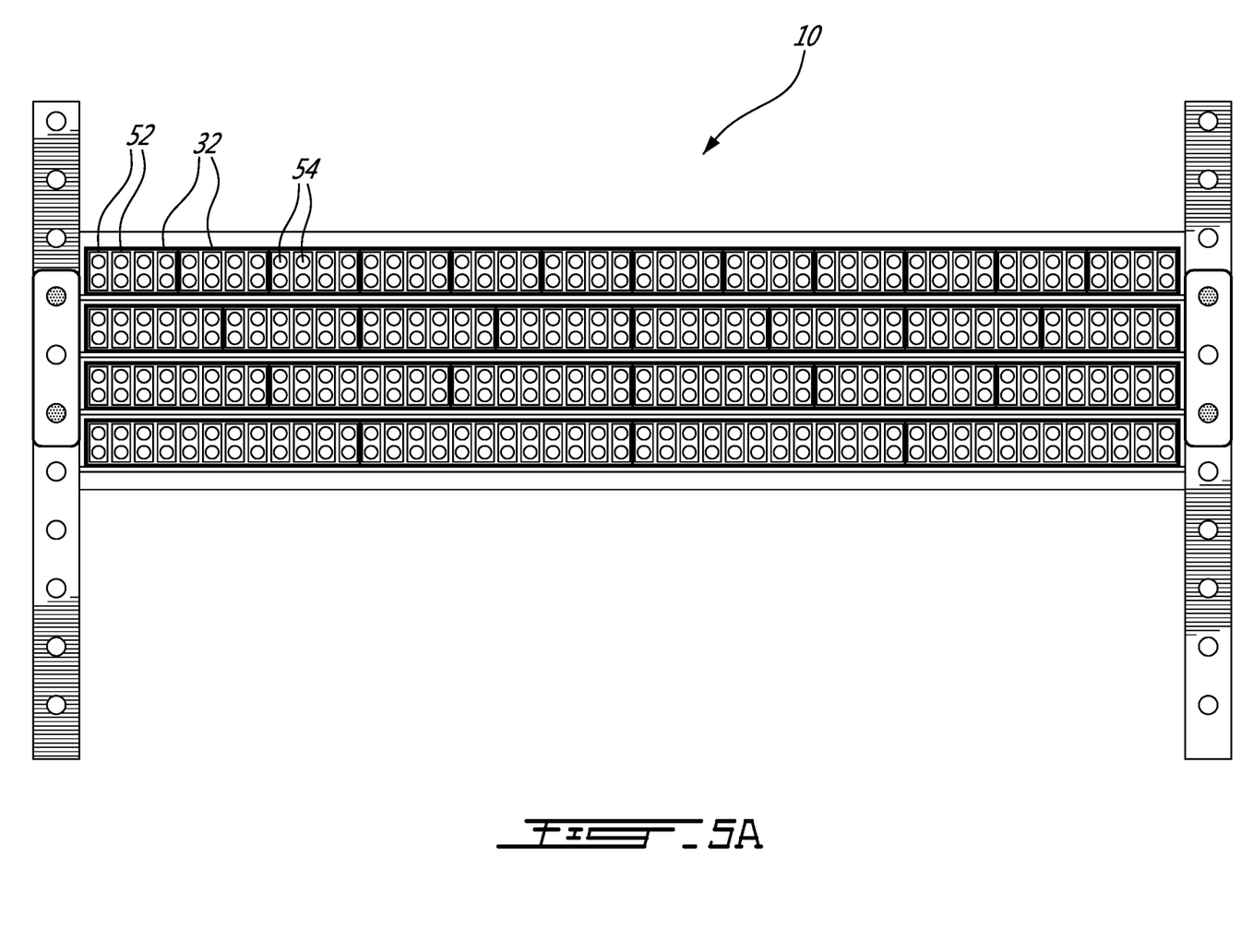
FIGS. 5A, 5B and 5C provide front plan views of a modular fiber optic cassette and system mounted in a rack respectively in accordance with first, second and third alternative embodiments of the present invention.

Referring now to FIG. 5A, in a first alternative embodiment of the system each receptacle modules 52 comprises a duplex type module arranged vertically. Additionally in a first cassette size four (4) of such duplex modules 52 are provided to provide for eight (8) receptacles 54 for terminating a fiber optic cable (not shown) comprised of eight (8) optic fibers. Similar to the first embodiment discussed above, sizes for twelve (12), sixteen (16) and twenty four (24) receptacles are also provided. Again, as the width of the cassettes is an integer multiple of the same pitch/width, cassettes of different widths can be used in the same tray system or in some cases on the same tray without modification or changing the density of the receptacles 54 for terminating optic fibres.

Figure 5B:
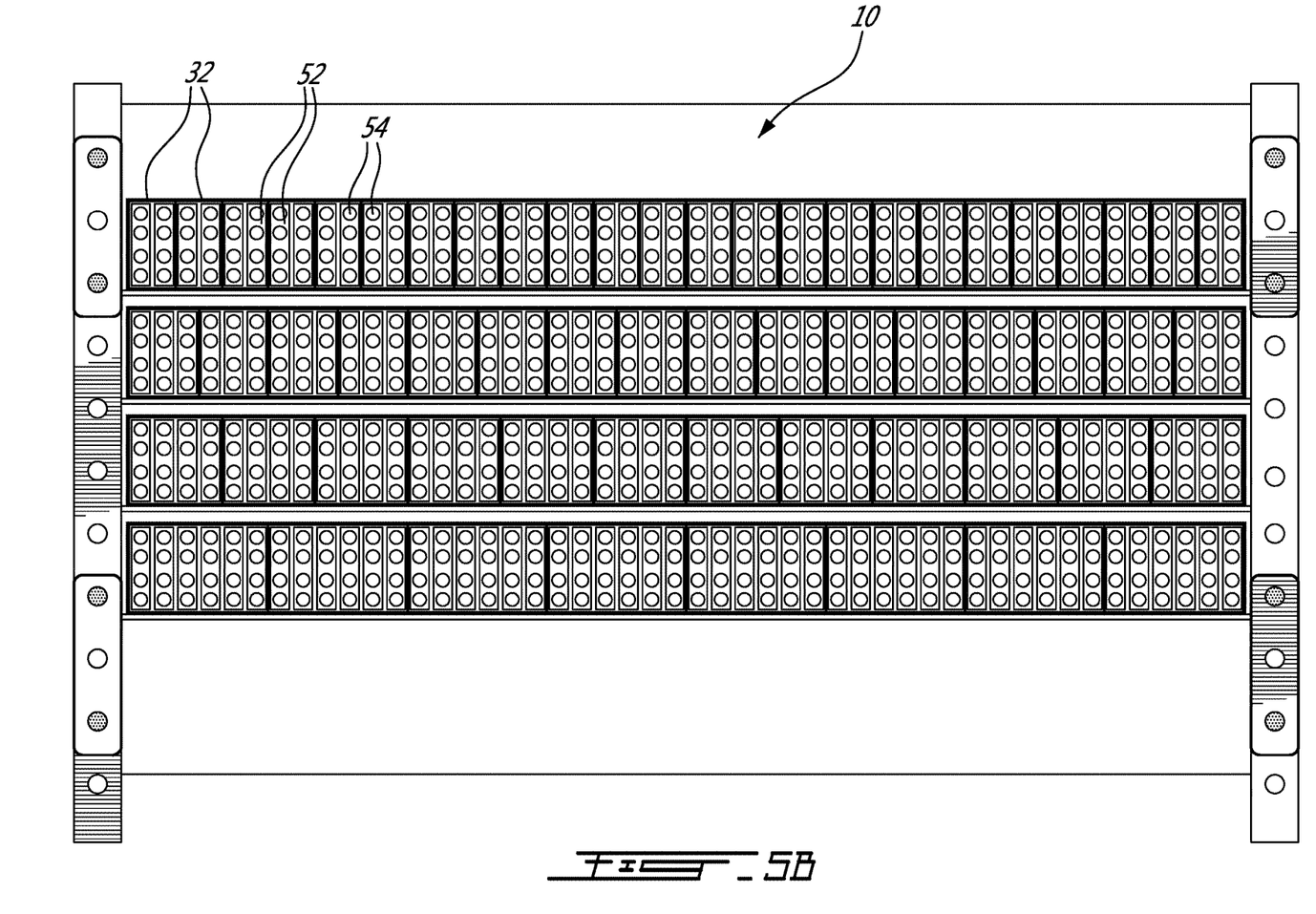

Referring now to FIG. 5B, in a second alternative embodiment of the system each receptacle modules 52 comprises a Quad type module arranged vertically. In a first cassette size two (2) of such quad modules 52 are provided to provide for eight (8) receptacles 54 for terminating a fiber optic cable (not shown) comprised of eight (8) optic fibers. Cassettes comprising three (3), four (4) and six (6) quad type modules 52 are provided to provide respectively twelve (12), sixteen (16) and twenty-four (24) receptacles. Again, as the width of the cassettes is an integer multiple of the same pitch/width, cassettes of different widths can be used in the same tray system or in some cases on the same tray without modification or changing the density of the receptacles 54 for terminating optic fibres.

Figure 5C:
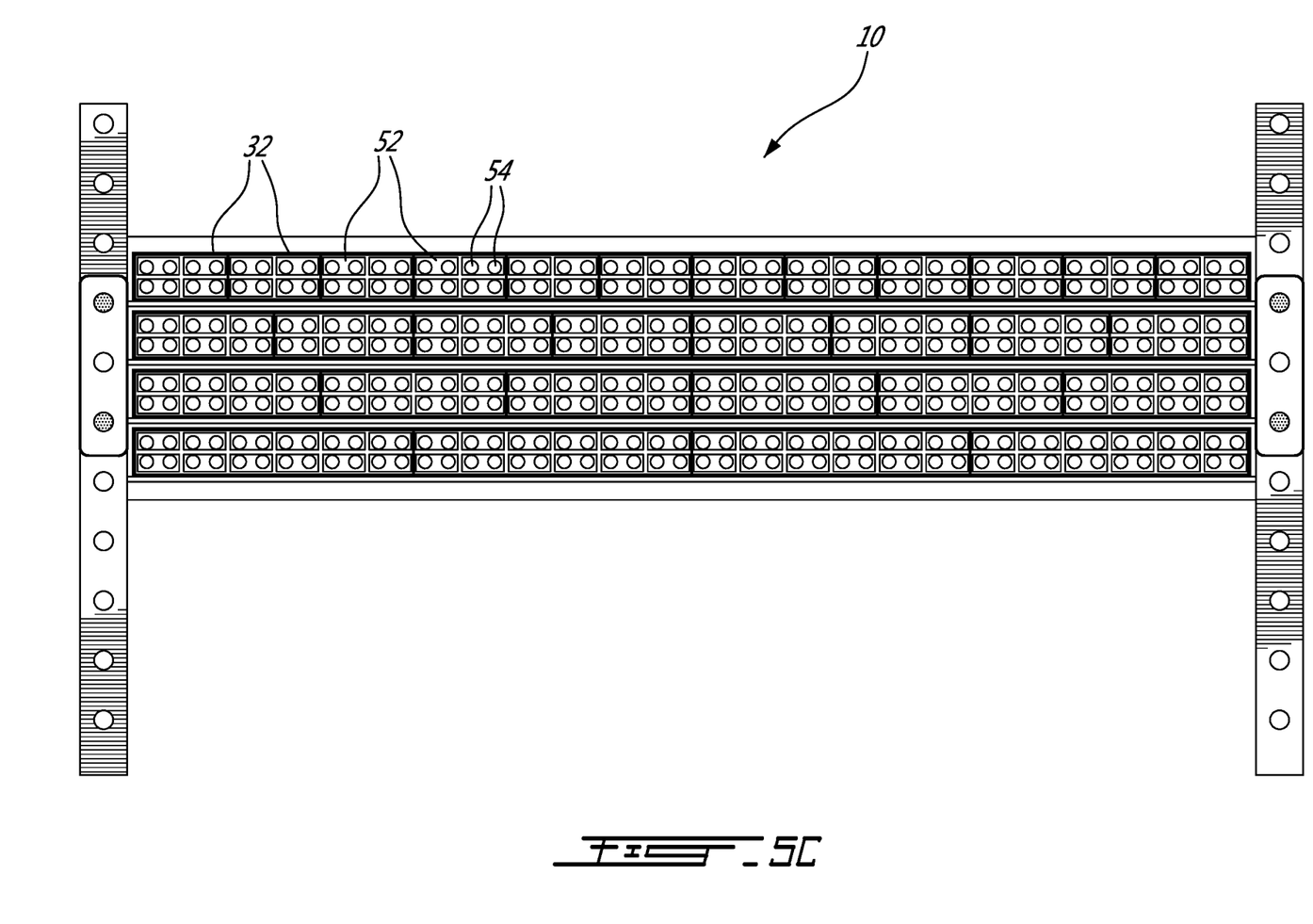

Referring now to FIG. 5C, in a third alternative embodiment of the system each receptacle modules 52 comprises a duplex type module arranged horizontally in two rows. In a first cassette size four (4) of such duplex modules 52 are provided to provide for eight (8) receptacles 54 for terminating a fiber optic cable (not shown) comprised of eight (8) optic fibers. Cassettes comprising six (6), eight (8) and twelve (12) duplex type modules 52 are provided to provide respectively twelve (12), sixteen (16) and twenty-four (24) receptacles. Again, as the width of the cassettes is an integer multiple of the same pitch/width, cassettes of different widths can be used in the same tray system or in some cases on the same tray without modification or changing the density of the receptacles 54 for terminating optic fibres.

Figure 6A:
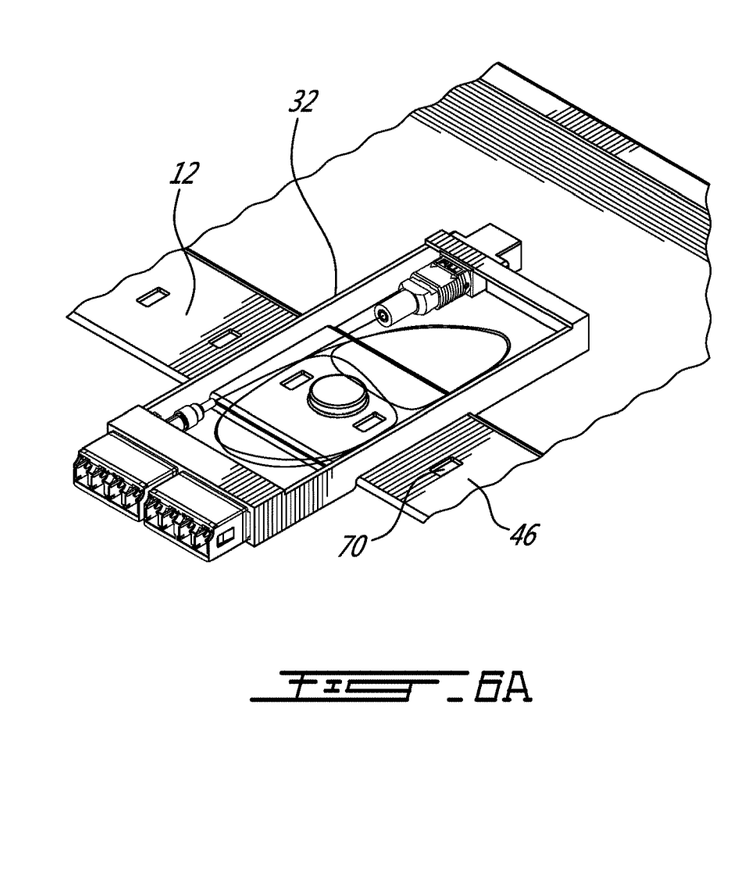
FIGS. 6A and 6B provide respectively a raised right front perspective view and a lowered right front perspective view of a modular fiber optic cassette in accordance with an alternative illustrative embodiment of the present invention.
Figure 6B:
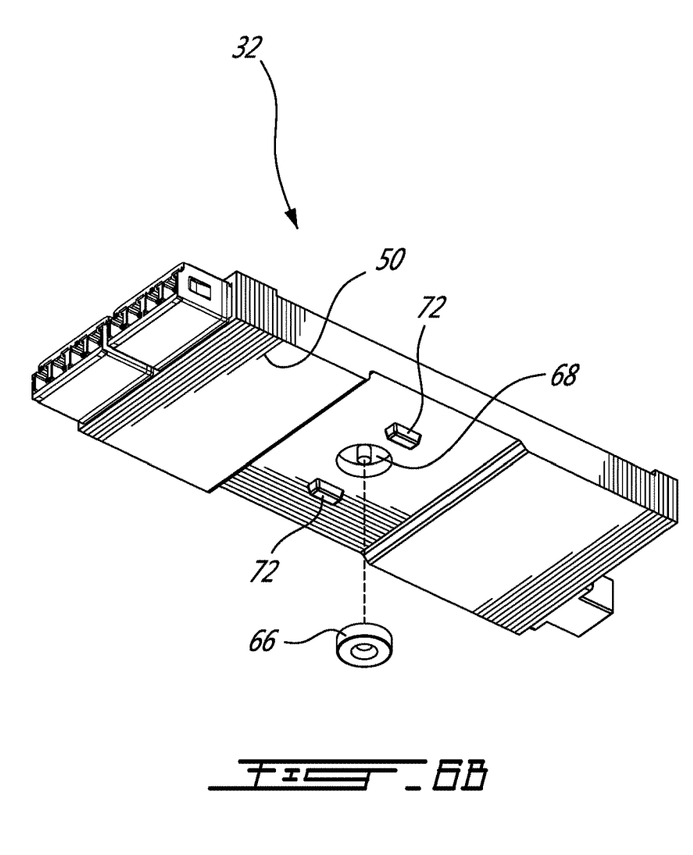

Referring now to FIGS. 6A and 6B in addition to FIG. 1, in an alternative embodiment of an assembly for securing the cassettes 32 to the tray 12 the tray 12 is manufactured from a ferrous material such as steel or the like and the fastener comprises a magnet 66 which is attracted to the tray and embedded or otherwise secured within a recess 68 formed in the underside 50 of the cassette 32. The tray 12, further comprises a series of spaced slots 70 arranged along the raised shoulder 46 which engage bosses 72 to ensure correct positioning of the cassettes 32 on the tray 12.

Figure 7A:
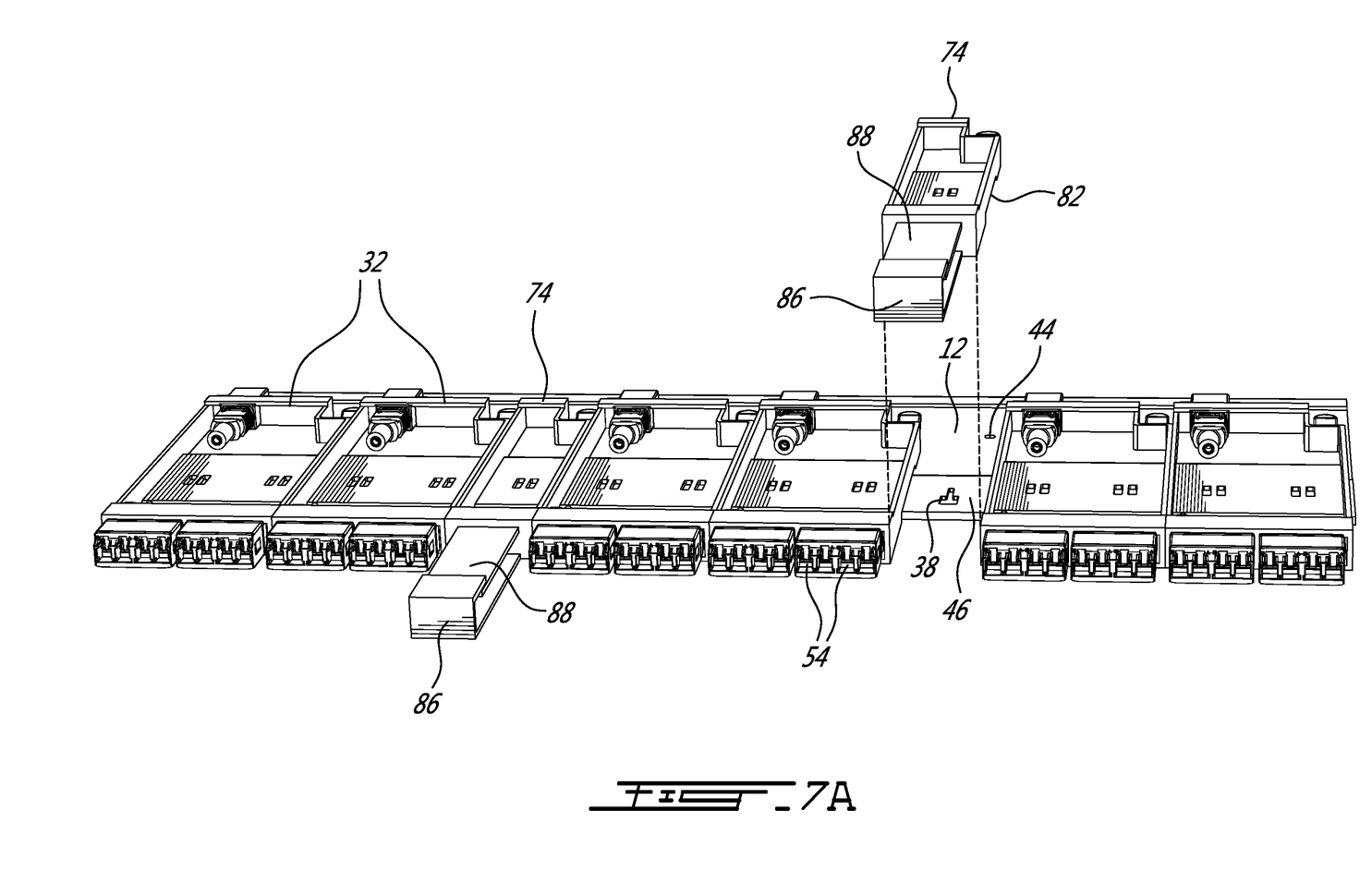
FIGS. 7A and 7B provide respectively a raised right front perspective view of a tray comprising a plurality modular fiber optic cassettes and a pair of cable management brackets and lowered right front perspective view of a cable management bracket in accordance with a second alternative illustrative embodiment of the present invention.
Figure 7B:
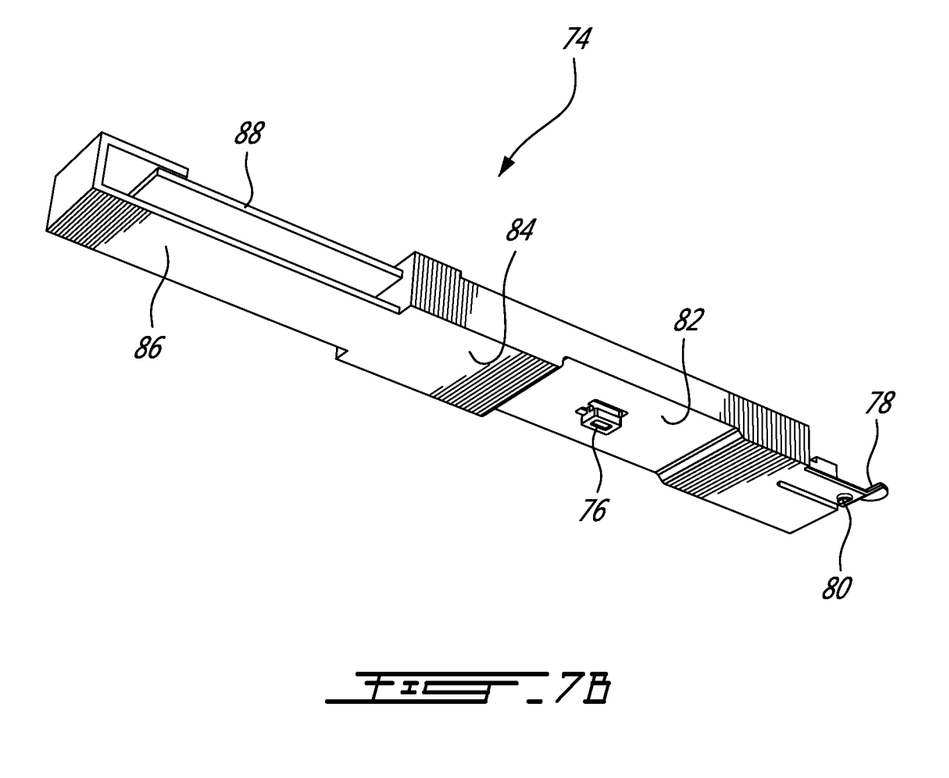

Referring now to FIG. 7A in a second alternative illustrative embodiment other equipment, such as a cable management bracket 74 can be provided with the same width W and such that they can be mounted to together with the cassettes 32 to the tray 12. In this regard, and with reference to FIG. 7B in addition to FIG. 7, the cable management bracket 74 is provided with tabs 76 comprising an inverted "T" cross section which engage with engage a slot 38 on the tray 12. A flexible tab 78 is provided which comprises a boss 80 that engages one of the apertures 44 in the tray 12 when the tab 76 is engaged within its respective slot 38, thereby releasable securing the cable management bracket 74 to the tray 12. In order to better orient the cable management bracket 74 on the tray during installation, the raised shoulder 46 of the tray 12 is received within a channel 82 moulded or otherwise formed in the underside 84 of the cable management bracket 74. Additionally, each cable management bracket 74 includes a cable management loop 86 for receiving a plurality of optic fibres (not shown) which are terminated at respective ones of the receptacles 54. A flexible strip 88 across the mouth of the cable management loop 86 is provided to releasably retain the plurality of optic fibers within the loop 86.

Although the present invention has been described hereinabove by way of specific embodiments thereof, it can be modified, without departing from the spirit and nature of the subject invention as defined in the appended claims.

The invention claimed is:

1. A modular fiber optic cassette system, the system comprising:
a case comprising a top and a bottom wall and two opposed side walls, each of said sidewalls attached between respective side edges of said top and bottom wall, said walls together defining a tray receiving space there between and a forward edge of each said wall together defining an opening to said tray receiving space;
at least one tray slideably received within said tray receiving space for movement between a stored position wherein said tray is completely inside said tray receiving space and an accessible position wherein a front end of said tray is in front of said opening and outside of said tray receiving space;
a set of fiber optic cassettes, a selected plurality of the cassettes arrangeable side by side along said tray front end wherein each of said cassettes comprises a plurality of optic plug receiving receptacles arranged side by side in a row along a front thereof, a first of said set of cassettes comprising a first cassette width of one of one, two, three, four and six standard width units and a second of said cassettes comprising a second cassette width different from said first cassette width and one of one, two, three, four and six standard width units; and
a fastener for removeably securing each of said cassettes to said tray
wherein when arranged on said at least one tray each of said fiber optic cassettes touches at least one other fiber optic cassette.

2. The modular fiber optic cassette system of claim 1, wherein said tray has a width dimensioned to receive at least twelve standard width units side by side.

3. The modular fiber optic cassette system of claim 1, wherein each of said cassettes comprises a multi fiber connector receiving receptacle arranged on a rear thereof and a plurality of optic fibers, one of said optic fibers interconnecting a respective one of said optic plug receiving receptacles with said multi fiber connector receiving receptacle.

4. The modular fiber optic cassette system of claim 1, wherein each of said cassettes comprises four fiber optic plug receiving receptacles arranged side by side in a row along a front thereof for each standard width unit.

5. The modular fiber optic cassette system of claim 1, wherein said system is for mounting in a rack and further comprising a pair of mounting brackets, one of said brackets attached to each of said sidewalls on either side of an outside of said case, said mounting brackets for securing said case to the rack.

6. The modular fiber optic cassette system of claim 1, wherein said tray is manufactured from a ferrous metal and said fastener comprises a magnet.

7. The modular fiber optic cassette system of claim 1, further comprising at least one elongate cable management bracket comprising a cable management loop and a fastener for removeably securing said at least one bracket to said tray, said bracket having a bracket width of one of said standard width units and further wherein when installed on said tray adjacent an installed one of said cassettes, said cable management loop is positioned in front of and to a side of said plurality of optic plug receiving receptacles of said installed cassette.

8. A method for organising a tray comprising a front edge in a fiber optic interconnect system, the method comprising:
defining a standard width unit wherein a width of the front edge is substantially evenly divisible by said standard width unit;
selecting a plurality of cassettes for installation on the tray from a set of cassettes having a plurality of different widths, wherein each of said different widths is evenly divisible by said standard width unit; and
releasably securing said selected cassettes along the front edge of the tray;
wherein when arranged on the tray each of said selected cassettes touches at least one other selected cassette.

9. The method for organising a tray of claim 8, wherein said set of cassettes comprises cassettes comprising widths of one, two, three, four and six standard width units.

10. The method for organising a tray of claim 8, wherein said selected cassettes all comprise the same width.

11. The method for organising a tray of claim 8, wherein said selected cassettes comprise a first cassette having a first width and a second cassette having a second width different from said first width.

12. The method for organising a tray of claim 8, wherein the width of the front edge is substantially evenly divisible by a maximum of twelve (12) of said standard width units.

13. The method for organising a tray of claim 12, wherein said selected cassettes further comprise a third cassette comprising a third width different from said first width and said second width.

14. A modular fiber optic cassette for releasably securing to a tray fabricated from a ferrous metal and comprising a plurality of spaced slots, the cassette comprising:
an elongate rectangular optic fiber receiving housing;
a plurality of optic plug receiving receptacles arranged in a row along a front of said housing;
a multi fiber connector receiving receptacle on a rear thereof;
a plurality of optic fibers interconnecting a respective one of said optic plug receiving receptacles with said multi fiber connector receiving receptacle;
a magnet secured to an underside of said housing; and
a pair of stabilizing bosses on said underside of said housing, each of said bosses on opposite sides of said magnet;

wherein when said cassette is placed on said tray, each of said bosses engages a respective one of said spaced slots.

15. The modular fiber optic cassette of claim 14, wherein the tray has a tray width substantially evenly divisible by a plurality of standard width units, wherein a plurality of the modular cassettes are arrangeable side by side along a front end of the tray and further wherein said cassette comprise a cassette width of one of one, two, three, four and six standard width units.

* * * * *

Disclaimer

10,795,107 B2 - Vincent Pilon, Lachine (CA). MODULAR FIBER OPTIC CASSETTE, SYSTEM AND METHOD. Patent dated October 6, 2020. Disclaimer filed July 7, 2025, by the assignee, Belden Canada ULC.

I hereby disclaim the following complete Claims 1-5, 8-13 of said patent.

*(Official Gazette, August 26, 2025)*